May 17, 1927.

W. E. TAYLOR 1,628,928

METHOD AND APPARATUS FOR MAKING CAN BODIES

Filed May 2, 1923   6 Sheets-Sheet 3

INVENTOR.
William E. Taylor
BY Munday, Clarke & Carpenter
ATTORNEYS

INVENTOR.
William E. Taylor
BY Munday, Clarke + Carpenter
ATTORNEYS

Patented May 17, 1927.

1,628,928

UNITED STATES PATENT OFFICE.

WILLIAM E. TAYLOR, OF EAST ORANGE, NEW JERSEY, ASSIGNOR TO AMERICAN CAN COMPANY, OF NEW YORK, N. Y., A CORPORATION OF NEW JERSEY.

METHOD AND APPARATUS FOR MAKING CAN BODIES.

Application filed May 2, 1923. Serial No. 636,073.

This invention relates to machines for making can bodies, particularly of that type in which the side edges are joined in what is known as a lap seam.

In order that the accomplishment of my invention may be clearly understood, brief reference will be made to the methods heretofore employed for the forming of lap seam can bodies. The common method of forming such a seam is by the application of solder to the overlapped edges and, in order to attain exact dimensions and accuracy of form, it has been necessary to employ sizing mechanism cooperating directly with the soldering apparatus. Since it takes some time for the solder to set sufficiently to hold the blank edges in exact relationship, complicated apparatus has been required to hold the blank in true form during this time. This apparatus has ordinarily consisted either of a machine of the multi-mandrel type, or of the multi-station type, both of which are subject to practical objections. It will be evident that, in the first-mentioned type of machine, a great deal of mechanism is necessary to provide the several mandrels and associated holding means, and, with the other, or multi-station type, complicated devices are required for holding the bodies in true form while, at the same time, permitting the advance thereof from station to station at the necessary rate of speed.

It is, therefore, a principal object of this invention to provide a machine in which the foregoing objections are overcome and which is adapted to eliminate the necessity of holding the formed body in the machine after the soldering operation. To this end, the invention contemplates the provision of means for preliminarily securing together the overlapped blank edges, as by spot welding, immediately after the blank has been brought to desired form, means for thereafter holding the blank during the time required for the solder to set being thus rendered unnecessary.

A further object is the provision of a can body making machine of this type in which the welding operation may be very rapidly performed to conform to the rate of speed of the other formative operations, with consequent large output and economy of production.

Other objects and advantages of the invention will be apparent as it is better understood from the following description, which, taken in connection with the accompanying drawings, discloses a preferred embodiment thereof.

Referring to the drawings.

Figure 1:
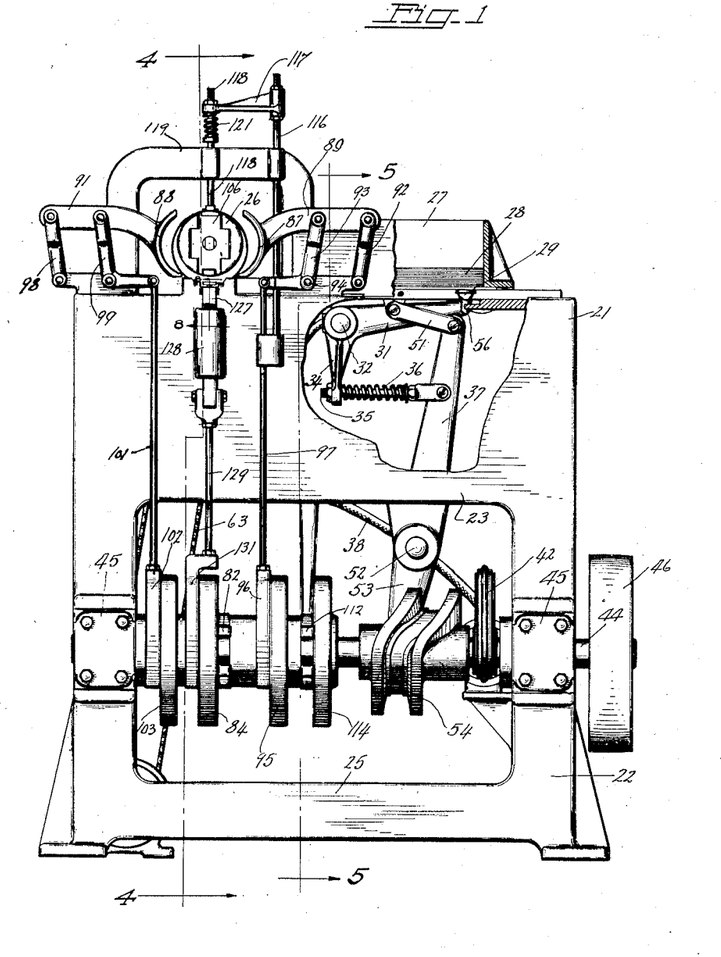
Figure 1 is an end elevation of a machine embodying my invention, a part thereof being broken away for convenience of illustration.

The apparatus illustrated is supported upon a frame 21, which consists of legs 22, a skirt portion 23, and a table part 24, the structure being braced by means of lower cross-connecting parts 25 between the legs 22 at the ends of the machine. Supported upon the table 24 is a mandrel, or forming horn, 26 upon which the blanks are adapted to be wrapped to form a cylindrical can body. The mounting and construction of this horn will be hereinafter more fully described, it being sufficient to note, at this point, that it is arranged in parallel relationship to the forward end of a blank stackholder 27 also positioned upon the table 24. A supply of blanks 28 is provided in said stackholder and means, perhaps best illustrated in Figs. 1, 5 and 6, are provided to remove the blanks individually from said stackholder and feed them to position adjacent the horn 26.

Said feeding means comprises two associated units, one for drawing the lowermost blank downwardly from the stack into feeding position and the other for advancing said blank to position adjacent the forming horn where it may be picked up by mechanism for arranging it upon the horn. The first-mentioned unit consists of a suction cup 29, which is carried on an arm 31 of a bell crank lever pivoted on a short shaft 32 carried in a bearing 33 depending from the under side of the table 24. A lower extension 34 of said bell crank lever is yieldingly connected by means of a rod 35 carrying a spring 36, with a lever 37 forming a part of the transverse feeding device. Said suction cup 29 is connected by a flexible tube 38 with a vacuum pump 39, which latter is operated by a piston 41 actuated by an eccentric 42 to which it is connected by means of a rod 43, said eccentric being mounted on a transverse shaft 44 mounted in bearings 45 at an end of the machine and adapted to be driven from any suitable source of power by a driving belt taking over a pulley 46.

Figures 5, 8:
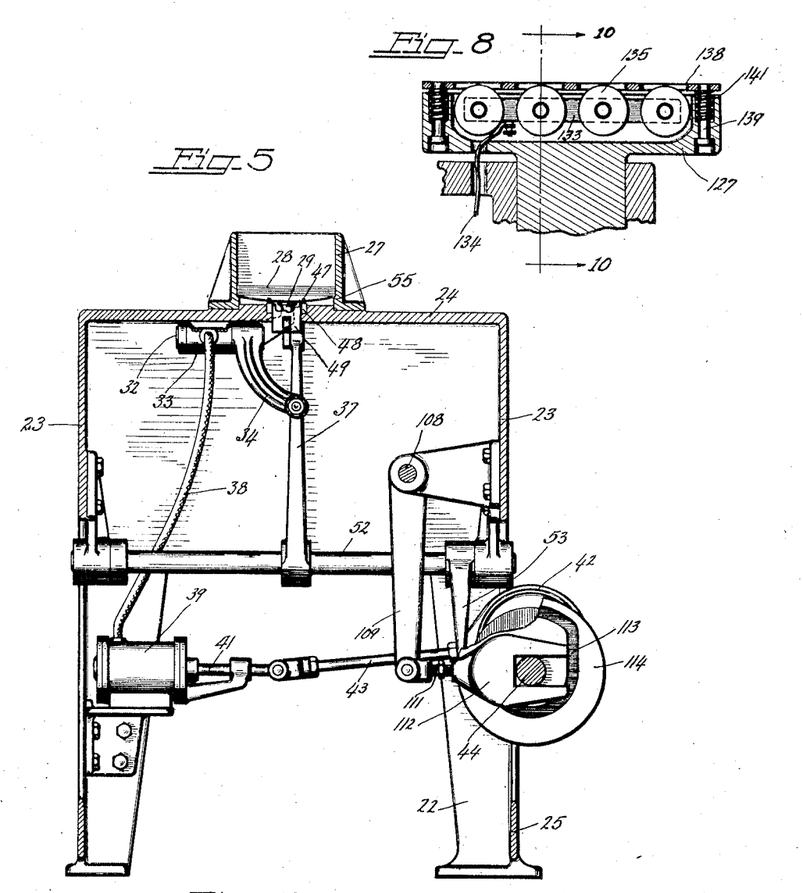
Fig. 5 is a section taken substantially on the line 5—5 in Fig. 1.
Fig. 8 is an enlarged sectional detail of the welding head, being taken substantially on the line 8—8 in Fig. 1.
Figure 6:
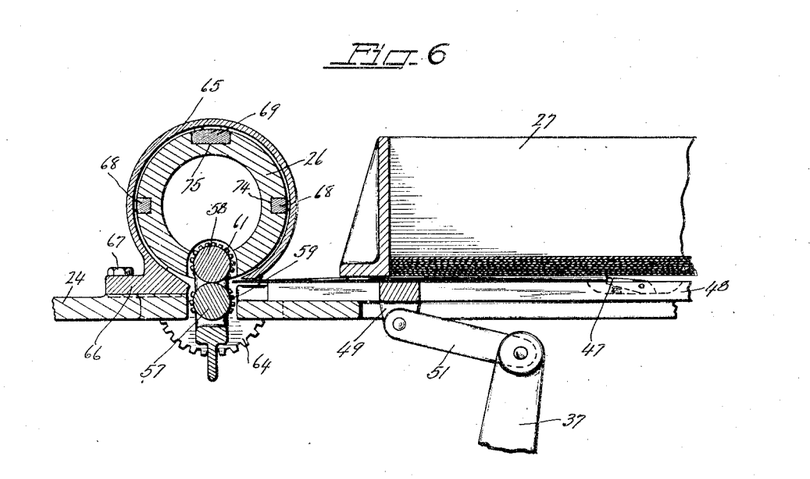
Fig. 6 is an enlarged sectional detail of the blank feeding apparatus and forming rolls, being taken substantially on the line 6—6 in Figs. 3 and 4.

Downward movement of the bell crank arm 31 with the cup 29 in engagement with the lowermost blank causes buckling of said blank as shown in Fig. 5, and when in this position, it may be engaged by spring dogs 47 carried upon feed bars 48, which latter are actuated by the lever 37, being connected thereto by means of a depending bracket 49 and a link 51. Said lever 37 is rocked to feed the blanks transversely of the table by means of a rock shaft 52, which is connected by a roller carrying arm 53 with a cam 54 on said drive shaft 44. The connection between the arm 34 and the lever 37 results in actuation of the arm 31 to first draw a blank downwardly from the stack, whereupon it is engaged by the dogs 47 and advanced in an obvious manner.

It will be noted that, contrary to the usual practice, the body blanks, in the present machine, are arranged with the short side thereof parallel with the forming horn and the greater length parallel with the path of travel to said horn. The longitudinal edges of the blank are normally supported upon shoulders 55 in the walls of the stackholder, and the action of the suction cup 29 serves to buckle, or bow, said blank longitudinally rather than transversely, with resultant lessening of the flexibility thereof. In order to prevent release of said blank prior to its being engaged by the dogs 47, I provide a stop 56 (Fig. 1), which serves to limit the downward movement of said suction cup, this being possible by reason of the yielding connection between the arm 34 and the lever 37.

The blank being advanced from beneath the stack is adapted to be engaged by forming rolls 57 and 58, which are geared together by gears 59 and 61 and driven from an electric motor 62 by means of a chain 63 taking over a sprocket 64 adapted to drive one of the gears previously mentioned. By this arrangement, the rolls 57 and 58 may be very rapidly driven, so that the blank is quickly removed from the transverse feeding device and fed about the mandrel, being directed, in the present instance, by means of an outer shell 65, having an integral bottom plate 66 secured by bolts 67 to the table 24.

Means are provided for advancing the formed blank along the horn 26 from position beneath said shell 65, said means consisting, in the present instance, of feed bars 68 and 69 disposed in grooves in the mandrel 26 and adapted to be reciprocated by means of a lever 71, connected thereto by means of a link 72 and a head member 73, to which each of said bars is attached. The bars 68 are disposed in side grooves 74 in the mandrel and the bar 69 is disposed in a top groove 75, each said bar having spring dogs 76 protruding above the surface of the mandrel and adapted to engage a blank to advance it in desired manner along the horn. Said lever 71 is pivoted at 77 to a bracket 78 extending inwardly from the frame skirt 23, said lever having a lower extension 79 connected by a rod 81 with a cam yoke 82 carrying a roller 83 riding in the groove of a face cam 84 carried on the drive shaft 44.

Figure 9:
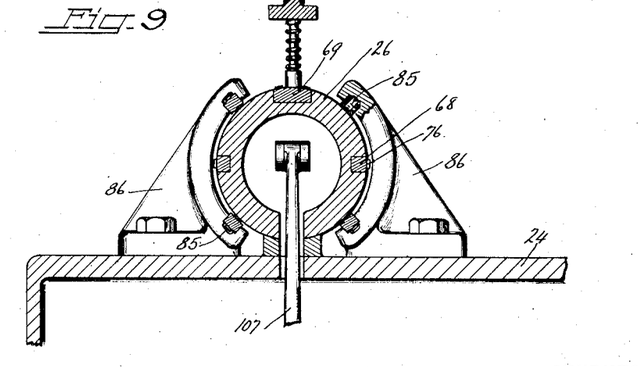
Fig. 9 is an enlarged sectional view, taken substantially on the line 9—9 in Fig. 3.

The blanks are first advanced to an idle station, this being illustrated in detail in Fig. 9. It will be observed that at this point the mandrel 26 is supported by rollers 85 positioned in brackets 86 fixed to the table 24, these rollers being adapted to permit passage of the blank along the mandrel with the latter firmly supported by said brackets. Upon the next forward reciprocation of the feed bars 68 and 69, the blank is moved from said idle station to a welding station to be now described.

Figure 4:
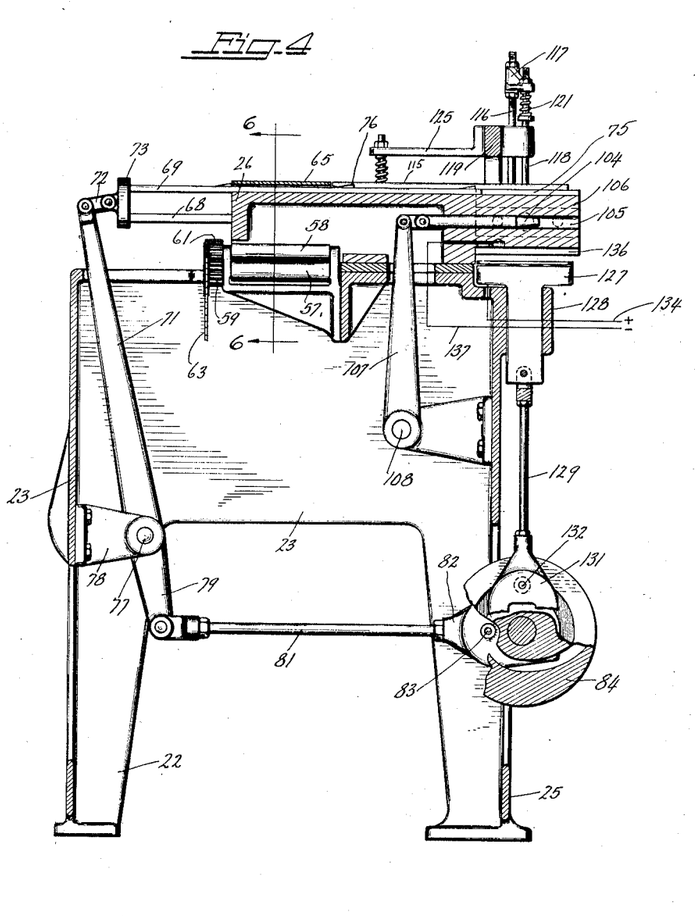
Fig. 4 is a longitudinal section taken substantially on the line 4—4 in Fig. 1.
Figure 7:
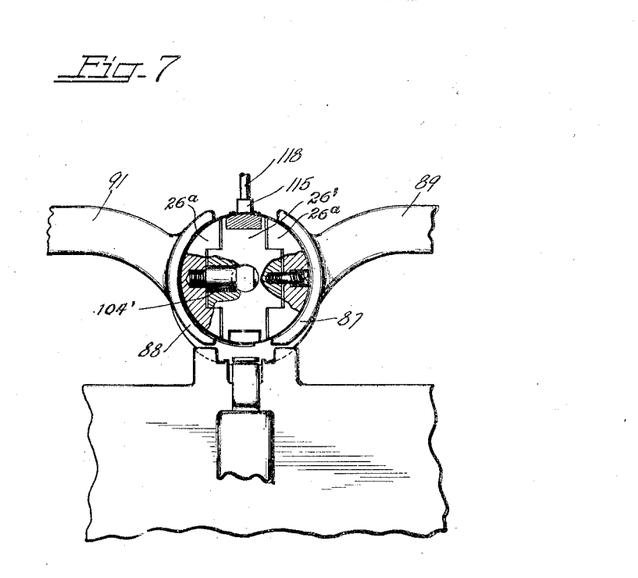
Fig. 7 is an enlarged elevational view of the body clamping and welding end of the machine.

By reference to Figs. 4 and 7, it will be observed that the mandrel at the end of the machine shown at the right in said Fig. 4, is reduced in size. Upon the blank being positioned upon this reduced mandrel portion, the edges are overlapped by means of jaws 87 and 88 formed in arms 89 and 91, successively actuated to bring first one edge and then the other of said blank against said mandrel. The arm 89 is pivotally mounted on the frame by means of a bifurcated supporting arm 92 and is acuated by a bell crank lever 93 pivoted at 94 to the frame and rocked by means of a cam 95 on the shaft 44 acting upon a roller carried in a cam yoke 96 at the lower end of a connecting rod 97 secured at its upper end to said bell crank 93. The arm 91 is supported on a supporting arm 98, similar to the arm 92, and is acuated by means of a bell crank lever 99, and a rod 101 and a cam yoke 102 carrying a roller following a groove in a cam 103.

After the edges of the blank are brought into overlapped relationship by the mechanism just described, this action causing the blank to assume the exact form and shape of the body desired. At such time the mandrel is of a size corresponding to the internal diameter of the desired cam, and the mandrel being collapsible for subsequent removal, this expanded, sized form is maintained by a wedge-shaped member 104 contacting pins 104' and extending through a recess 105 in a central part 106 of the reduced portion of the mandrel in a well-known manner. The wedge member 104 is actuated by means of a lever 107 pivoted on a transverse shaft 108, which latter is rocked by an actuation lever 109 connected by a link 111 with a cam yoke 112 which straddles the shaft 44 and is actuated by a roller following a groove 113 in a cam 114 on said shaft 44.

Figure 2:
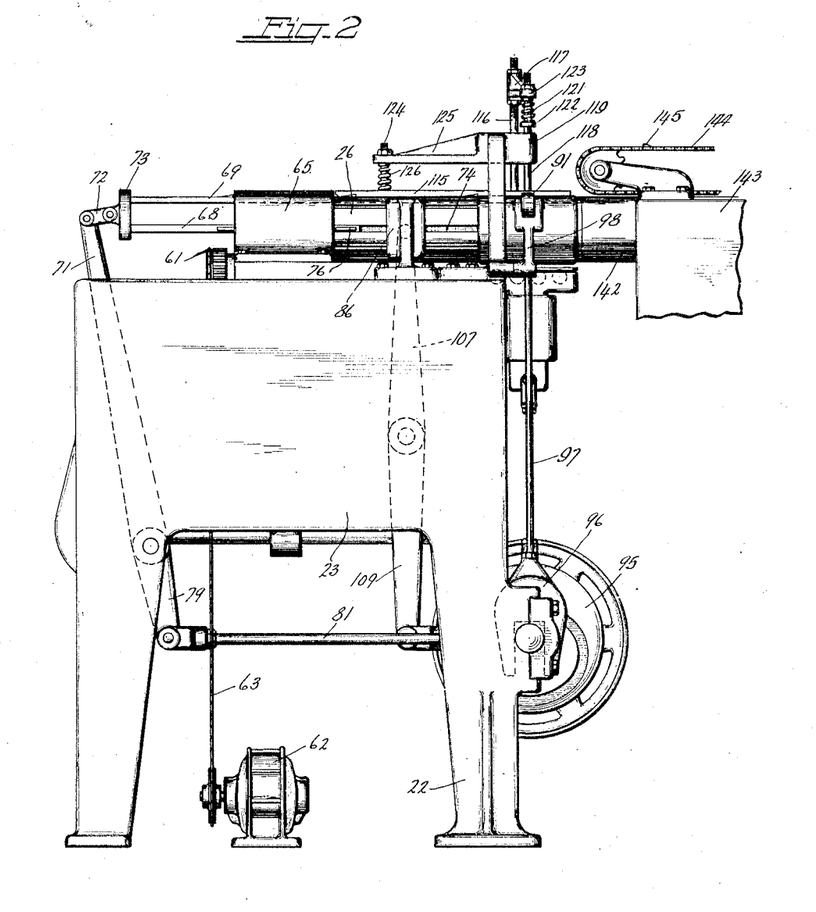
Fig. 2 is a side elevational view thereof, showing merely the receiving end of the soldering machine.
Figure 3:
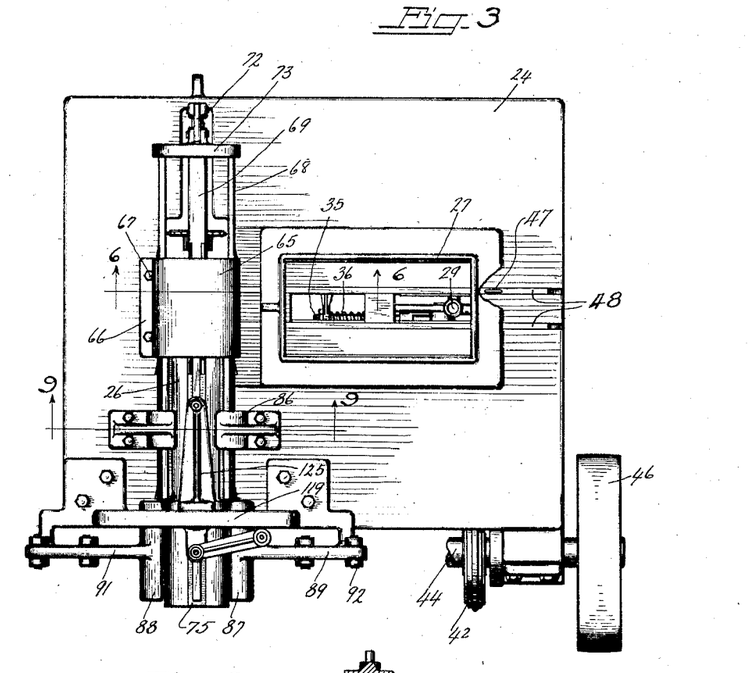
Fig. 3 is a top plan view.

It should be understood that the blank is clamped to the horn both at the idle station heretofore referred to and at the clamping station just described, to prevent its being returned upon rearward reciprocation of the feed bars 68 and 69, this clamping action being accomplished by means of a clamping bar 115 supported at the top of the mandrel and adapted to be brought into clamping position by means illustrated particularly in Figs. 1, 2, and 4. Said means consists of a rod 116 actuated by the cam 95 and connected at its upper end to a bracket 117, which carries at its opposite end a rod 118 extending through a yoke 119, which extends up from the frame and over the mandrel, said rod 118 being secured at its lower end to said clamping bar 115. A spring 121 is positioned on the rod 118, between a collar 122 and an extension 123 on the bracket 117, said spring tending to normally hold said bar in clamping position. The opposite end of the bar is supported by a rod 124 extending downwardly from a forward extension 125 of the yoke 119. A spring 126 is positioned on said rod 124 and it will be manifest that lifting of said bar 115 is accomplished by the rod 116 against the tension of the spring 126. By this mechanism, the body blank is clamped to the horn at the successive stations and is released at the right time for further advance.

Figure 10:
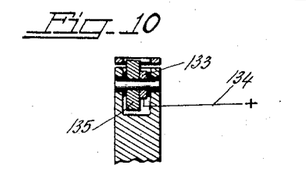
Fig. 10 is a sectional view, taken transversely of the welding head, substantially on the line 10—10 in Fig. 8.

Upon the blank being clamped to the expanded and sized horn, the edges thereof are welded together by means of mechanism illustrated in detail in Figs. 4, 8 and 10. This mechanism consists of a welding head 127, which is vertically reciprocated in a bearing 128 by means of a rod 129 and a cam yoke 131 having a roller 132 following a groove in the cam 84. This welding head is shown in enlarged section in Fig. 8, and consists of a copper bar 133 connected with a source of electrical current by a connection 134, said bar carrying a plurality of rollers 135 adapted to be brought into contact with the outer edge of the blank opposite a copper bar 136 positioned on the lower side of the mandrel within the inner blank edge and connected by a connection 137 with the electrical current. Contact of the rollers 135 with the blank thus results in welding the edges together at the contacted points, and it will be understood that any desired form of contact members might be employed in place of the rollers 135, within the purview of the invention. An advantage of the rollers, however, is that, being freely rotatable upon their axes, the points of contact may be varied with any slight rotation of said rollers.

A stripper plate 138 is provided at the top of the head 127, being carried on slidable studs 139 upon which are positioned springs 141, permitting depression of said plate upon contact with the body. Said springs serve to hold said plate in contact with the blank upon initial withdrawal of the welding head, so that the blank may be effectively freed from engagement with the rollers 135. It will be recognized that the welding action may be accomplished in a very short space of time and upon completion thereof, the clamp 115 is released and the upper feed bar 68 advances the blank onto a horn 142 of a soldering machine 143 positioned adjacent the apparatus just described. This machine may be of any of the usual or preferred forms employed for this purpose. I have shown merely a feeding chain 144 provided with lugs 145 adapted to engage the body blanks and move them along the solder mandrel during which movement solder is applied by rolls, or otherwise, to complete the seam. Patent 1,178,946 to Rudolphi et al, granted Apr. 11, 1916, having an inside soldering horn, or 1,338,716 to Widell granted May 4, 1920 and having an outside soldering horn, are suitable constructions to receive the welded cans from the mandrel or horn 26 by means of the chain 144 and perform the soldering operation.

Inasmuch as the blank edges are welded prior to being subjected to the soldering operation, it is manifest that the body need not be held in the machine awaiting the setting of the solder, but may be immediately removed and this results in a very great reduction in the time and amount of apparatus required, as heretofore stated. Furthermore, the operations are much simpler and fewer in number than those required for the formation of a lock and lap seam, in which the blank must be notched, edged, locked and finally closed by separate operations.

It is thought that the invention and many of its attendant advantages will be understood from the foregoing description, and it will be apparent that various changes may be made in the form, construction and arrangement of the parts, without departing from the spirit and scope of the invention, or sacrificing all of its material advantages, the form hereinbefore described being merely a preferred embodiment thereof.

I claim:

1. A machine for forming can bodies of the lap seam type, comprising a forming horn, a holder for blanks adjacent said horn, a suction feed for removing the blanks downwardly from said holder, means for limiting the movement of said suction feed in accordance with the flexibility of the blank in the position assumed, means for feeding the separated blanks directly to said mandrel, means for arranging the blanks in body form upon the mandrel, and means for welding the blank edges to maintain exact relationship therebetween during a subsequent seam finishing operation.

2. The method of forming can bodies which consists in arranging a blank upon a forming horn, advancing it directly past successive operating stations on said horn, welding the blank edges together at one of said stations, and applying solder at another station to complete the seam.

3. The method of forming can bodies which consists in arranging a blank upon a forming horn, advancing it directly past successive operating stations on said horn, welding the blank edges together at one of said stations, and applying solder to another station to complete the seam, said welding operation permitting immediate removal of the formed can body from the machine after the soldering operation.

4. The combination of a can body forming horn, a stack holder for body blanks arranged at the side of the horn, means for drawing downward the bottom blank, feeding means movable towards the side of the horn at the bottom of the horn for propelling the blank under the same, rollers arranged at the bottom of the horn for receiving said blank and curling it around over the horn, welding means arranged and operating at the under side of the horn for welding together the lapped edges of the body, and mechanism operating said elements in timed relation.

5. The combination of a can body forming horn, a stack holder for body blanks arranged at the side of the horn, means for drawing downward the bottom blank, feeding means movable towards the side of the horn at the bottom of the horn for propelling the blank under the same, rollers arranged at the bottom of the horn for receiving said blank and curling it around over the horn, welding means arranged and operating at the under side of the horn for welding together the lapped edges of the body, means for soldering the welded lap seam, feed devices for propelling the welded body to said soldering means, and mechanism operating said elements in timed relation.

6. A combination of a can body forming horn, a stack holder for body blanks arranged at the side of the horn, means for drawing downward the bottom blank, feeding means movable towards the side of the horn at the bottom of the horn for propelling the blank under the same, rollers arranged at the bottom of the horn for receiving said blank and curling it around over the horn, welding means comprising an upwardly movable electrode-head arranged and operating at the under side of the horn for welding together the lapped edges of the body, and mechanism operating said elements in timed relation.

7. The combination of a can body forming horn, a stack holder for body blanks arranged at the side of the horn, means for drawing downward the bottom blank, feeding means movable towards the side of the horn at the bottom of the horn for propelling the blank under the same, rollers arranged at the bottom of the horn for receiving said blank and curling it around over the horn, welding means comprising an upwardly movable series of electrode-rollers situated in line with each other and arranged and operating at the under side of the horn for welding together the lapped edges of the body, and mechanism operating said elements in timed relation.

8. The combination of a can body forming horn, a stack holder for body blanks arranged at the side of the horn, means for drawing downward the bottom blank, feeding means movable towards the side of the horn at the bottom of the horn for propelling the blank under the same, rollers arranged at the bottom of the horn for receiving said blank and curling it around over the horn, welding means comprising an upwardly movable series of electrode-rollers situated in line with each other and arranged and operating at the under side of the horn for welding together the lapped edges of the body, a yielding stripper plate enclosing said rollers, and mechanism operating said elements in timed relation.

9. The combination of a can body forming horn, a stack holder for body blanks arranged at the side of the horn, means for drawing downward the bottom blank, feeding means movable towards the side of the horn at the bottom of the horn for propelling the blank under the same, rollers arranged at the bottom of the horn for receiving said blank and curling it around over the horn, rollers for confining in curled form the blank against the horn, welding means arranged and operating at the under side of the horn for welding together the lapped edges of the body, and mechanism operating said elements in timed relation.

10. The combination of a can body forming horn, a stack holder for body blanks arranged at the side of the horn, means for drawing downward the bottom blank, feeding means movable towards the side of the horn at the bottom of the horn for propelling the blank under the same, rollers arranged at the bottom of the horn for receiving said blank and curling it around over the horn, successively actuated jaws for lapping the edges of the blanks, welding means arranged and operating at the under side of the horn for welding together the lapped edges of the body, and mechanism operating said elements in timed relation.

WILLIAM E. TAYLOR.